United States Patent [19]

Fairchild et al.

[11] Patent Number: 6,071,336
[45] Date of Patent: *Jun. 6, 2000

[54] ACICULAR CALCITE AND ARAGONITE CALCIUM CARBONATE

[75] Inventors: George Henry Fairchild, Bethlehem; Richard Louis Thatcher, Treichlers, both of Pa.

[73] Assignee: Minerals Technologies Inc., Bethlehem, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/711,427

[22] Filed: Sep. 5, 1996

[51] Int. Cl.$^7$ ..................................................... C01F 11/18
[52] U.S. Cl. ............................................ 106/464; 423/430
[58] Field of Search .................................. 423/430, 432; 106/464

[56] References Cited

U.S. PATENT DOCUMENTS

| | | | |
|---|---|---|---|
| 4,157,379 | 6/1979 | Arika et al. | 423/430 |
| 4,775,420 | 10/1988 | Gonnet et al. | 423/430 |
| 4,824,654 | 4/1989 | Ota et al. | 423/432 |
| 5,164,172 | 11/1992 | Katayama et al. | 423/430 |
| 5,376,343 | 12/1994 | Fouche | 423/432 |
| 5,695,733 | 12/1997 | Kroc et al. | 423/432 |

FOREIGN PATENT DOCUMENTS

| | | |
|---|---|---|
| 0406662 | of 1990 | European Pat. Off. . |
| 0581981 | of 1992 | European Pat. Off. . |

OTHER PUBLICATIONS

Pfizer Inc., Product Data Sheet, ALBACAR HO®, no date.

T. L. Thompson, L. R. Hossner, and L. P. Wilding, Micromorphology of Calcium Carbonate in Bauxite Processing Waste, Elsevier Science Publishers B. V. Amsterdam, p 31–42, 1991.

J. Duclous, Poitiers, A. Laouina, Rabat, The Pendent Calcretes in Semi–Arid Climates: An Example Located Near Taforalt, NW Morocco, Catena Verla, vol. 16, p. 237–249, 1989.

*Primary Examiner*—Tom Dunn
*Assistant Examiner*—Stuart L. Hendrickson
*Attorney, Agent, or Firm*—Marvin J. Powell; Terry B. Morris

[57] ABSTRACT

The present invention relates to a calcium carbonate composition having both calcite and aragonite crystalline morphology. More particularly, the present invention relates to an acicular calcite and an acicular aragonite product and a method for the production of the same and the use of such as fillers, additives and modifiers of consumer and commercial products such as toothpaste, paper, plastics and sealants. The acicular calcite/aragonite composition of the present invention provides a balance of properties such as sheet bulk, strength, stiffness, and sizing, when employed as a filler for paper. As a coating pigment, the acicular calcite/aragonite product of the present invention provides gloss characteristics suitable for dull and matte grades of low gloss coated paper. Upon further processing such as milling, grinding, or other means of comminution, the resulting product provides gloss characteristics suitable for high gloss coated paper. For paint formulations, the acicular calcite/aragonite composition of the present invention provides properties such as low sheen and high contrast ratio. As an additive in polymers, the acicular calcite/aragonite product of the present invention imparts reinforcing properties, rigidity, and impact strength, including sealant applications.

4 Claims, No Drawings

ACICULAR CALCITE AND ARAGONITE CALCIUM CARBONATE

FIELD OF INVENTION

The present invention relates to a calcium carbonate composition, a process for producing the composition, and a method of using the composition in commercial and consumer related applications. More particularly, the present invention relates to a calcium carbonate composition having both acicular calcite and acicular aragonite crystalline morphology. Acicular calcite and aragonite compositions produced according to the process of the present invention are particularly useful as fillers in pharmaceutical products, paper, paper coating, consumer products such as paints, toothpaste and as additives for polymers and sealants.

BACKGROUND OF THE INVENTION

It is known that calcium carbonate may occur naturally or may be synthetically produced in three particular crystalline morphologies, calcite, aragonite, and less commonly found, vaterite. The vaterite form of calcium carbonate is metastable and irreversibly transforms into calcite and aragonite.

The calcite crystalline morphology is the most commonly used crystal form of calcium carbonate. Over 300 crystalline forms of calcite have been reported in the literature. Many of these crystal forms of calcite, such as scalenohedral, prismatic and rhombohedral, are readily available through precipitation production technology. Although less commonly known, an acicular crystalline form of calcite has also been reported. Acicular refers to the shape of the crystals, which are typically clusters of rod-shaped or needle-like crystalline morphologies. For example, acicular calcite morphology has been reported to occur in nature as pendent calcretes in semi-arid climates, Ducloux J. and Laouina, The Pendent Calcretes in Semi-Arid Climates, *Catena*, vol. 16, pages 237–249, (1989). Another acicular calcitic micromorphic form of calcium carbonate has been reported to occur in bauxite processing waste, Thomas T. L., Hossner L. R. and Wilding L. P., Micromorphology of Calcium Carbonate in Bauxite Processing Waste, *Geoderma*, vol. 48, pages 31–42, (1991).

It is also known that aragonitic calcium carbonate occurs naturally and may also be produced by precipitation production technology in acicular crystalline form. It is further known that acicular aragonite occurs predominately in rod-shaped or needle-shaped crystalline forms.

Although acicular calcite and acicular aragonite are known in the art as separate and distinct crystalline forms, compositions, having both acicular calcite and acicular aragonite in a state of co-existence, are unknown.

Therefore, what has been found to be novel and unanticipated by the prior art is a composition, method and use of calcium carbonate morphology having both acicular calcite and acicular aragonite crystalline form.

RELATED ART

U.S. Pat. No. 5,164,172 discloses a process for producing acicular aragonite calcium carbonate crystal by premixing aragonite crystal form calcium carbonate having an acicular shape and calcium hydroxide to produce a slurry, adding phosphoric acid and water-soluble salts into the aqueous slurry, and introducing carbon dioxide gas into the aqueous slurry to cause a carbonation to take place thereby producing aragonite crystal having an acicular shape.

German Patent No. 3,339,996 discloses a calcite calcium carbonate in needle, thread, and/or rod formation, produced by the precipitation of calcium hydroxide with carbon dioxide in a watery suspension in the presence of certain quantities of phosphates. Calcium carbonate produced according to the process of the invention is suggested to be useful to strengthen plastics, especially rubber.

European Patent Application 0 581,981A discloses a process for producing needle-shaped calcium carbonate particles which are mainly aragonite crystals by reacting a ternary system having calcium chloride, magnesium hydroxide, and water with carbon dioxide gas at a temperature not lower than 60° Centigrade. The needle-shaped calcium carbonate produced according to this process are suggested to be several times less expensive due to the high production efficiency of the process.

Although various methods for the production of calcium carbonate having an acicular shapes are disclosed, none of the related art discloses a product, a process for the production of a calcium carbonate product or a method of use, having both acicular-shaped calcite and acicular-shaped aragonite crystalline morphology in co-existence.

Therefore, an object of the present invention is to provide a composition of acicular calcite and acicular aragonite. Another object of the present invention to provide a process for producing the calcitic and aragonitic calcium carbonate crystal having an acicular shape. Still another object of the present invention is the method of using the acicular calcite/acicular aragonite product in paper filling, paper coating, paint, polymers and sealants. These and other objects will become more apparent upon further review of the detailed description of the present invention which follows.

BRIEF DESCRIPTION OF DRAWINGS

FIG. 1 is a microphotograph of the product produced in Example 1.

FIG. 2 is a microphotograph of the product produced in Example 2.

FIG. 3 is a microphotograph of the product produced in Example 3.

FIG. 4 is a microphotograph of the product produced in Example 4.

SUMMARY OF INVENTION

The present invention comprises a composition of calcite and aragonite calcium carbonate having clusters of rod-shaped or needle-shaped acicular crystals. The clusters are further characterized by an average equivalent spherical diameter of from about 2.0 microns to about 8.0 microns and a specific surface area of from about 5.0 square meters per gram ($m^2/g$) to about 10.0 $m^2/g$. The individual crystals are further characterized as rods or needles having a length of from about 1.0 micron to about 4.0 microns and a width of from about 0.1 micron to about 0.5 micron. The relative amount of calcite and aragonite in the composition ranges from about 20 percent calcite/80 percent aragonite to about 80 percent calcite/20 percent aragonite.

The process for producing the acicular calcite/aragonite composition of the present invention involves the reaction of calcium hydroxide, $Ca(OH)_2$, or calcium oxide, CaO, with carbon dioxide, $CO_2$, in the presence of water soluble aluminum compounds.

DETAILED DESCRIPTION OF THE INVENTION

The present invention encompasses a composition of calcitic and aragonitic calcium carbonate, consisting of clusters of individual rod-shaped or needle-shaped acicular crystals. The clusters are further characterized by an average equivalent spherical diameter of from about 2.0 microns to about 8.0 microns and a specific surface area of from about 5.0 m$^2$/g to about 10.0 m$^2$/g. Average equivalent spherical diameter is used to specify the average (median) size of a non-spherical particle in terms of the diameter of a sphere of the same material that would have the same mass as the particle in question. This value is calculated based on the sedimentation rate of the particle in questions as defined by Stokes' Law, *Micromeritics SediGraph* 5100 Particle Size Analysis System Operator's Manual, V2.03, 1990. Specific surface area refers to the area of the surface of a particle per unit weight based on the quantity of nitrogen gas that absorbs as a single layer of gas molecules on the particle. Once the gas adsorption properties of the material in question have been measured, then the surface area of the material in question is calculated using the Brunauer-Emmett-Teller equation, *Micromentics Flowsorb II* 2300 *Instruction Manual,* 1986. The individual crystals are further characterized as rods or needles having a length of from about 1.0 micron to about 4.0 microns and a width of from about 0.1 micron to about 0.5 micron. The relative ratio of calcite and aragonite in the composition ranges from about 20 percent calcite/80 percent aragonite to about 80 percent calcite/20 percent aragonite.

The process for producing the acicular calcite/aragonite composition of the present invention involves, the reaction of calcium hydroxide, Ca(OH)$_2$, or calcium oxide, CaO, with carbon dioxide, CO$_2$, in the presence of water soluble aluminum compounds. The process involves the addition of Ca(OH)$_2$ and CO$_2$, or CaO and CO$_2$ to an aqueous solution containing water soluble aluminum compounds. The calcium hydroxide may be added by any process known in the art, however, it has been found that when the calcium hydroxide is simultaneously added to the water soluble aluminum compounds of the present invention, a crystal having calcitic and aragonitic morphology is produced.

In one aspect of the process according to the present invention, the addition of the Ca(OH)$_2$ or CaO and CO$_2$ is carried out such that the solution conductivity of the resulting reaction is from about 4.0 milliSiemens per centimeter (mS/cm) to about 7.0 mS/cm, preferably, from about 5.0 mS/cm to about 6.0 mS/cm. The solution conductivity of the resulting reaction of the calcium hydroxide and carbon dioxide or the calcium oxide and carbon dioxide with the water soluble aluminum compound can be carried out over a very broad range. Conductivity as used herein refers to the electrical conductivity properties of an aqueous slurry which is due to the presence of ions (e.g. Ca$^{2+}$, OH$^-$, Al$^{3+}$, SO$_4^{2-}$) in the aqueous phase. The measurement that is made during the carbonation process is actually the specific conductivity, which is a measure of the electrical conductivity of the aqueous slurry through 1 centimeter (cm) of the slurry. The units for specific conductivity are milliSiemens per centimeter (mS/cm). However, when the conductivity is carried out at less than about 4.0 mS/cm, the final product is generally blocky, rhombohedral calcite. When the conductivity is carried out above about 7.0 mS/cm, the final product is scalenohedral calcite. The solution conductivity of the reaction mixture may be controlled within the specified range by (a) increasing or decreasing the addition rate of the Ca(OH)$_2$ or CaO at a constant flow rate of CO$_2$; (b) increasing or decreasing the CO$_2$ flow rate at a constant addition rate of Ca(OH)$_2$ or CaO; or, (c) varying both the CO$_2$ flow rate and addition rate of the Ca(OH)$_2$ or CaO. Of the three solution conductivity control methods available, method (a) is preferred.

In another aspect of the process according to the present invention, the addition of the Ca(OH)$_2$ or CaO is carried out such that the total amount of Ca(OH)$_2$ or CaO is added over a period of time ranging from about fifteen (15) minutes to about one hundred twenty (120) minutes, with a preferred range of from about forty-five (45) minutes to about ninety (90) minutes. However, when the process of the present invention is carried out at a time of less than about fifteen (15) minutes, it is difficult to control the conductivity. Further, when the addition of calcium hydroxide or calcium oxide is added over a period of time longer than about one hundred twenty (120) minutes, the final product may be blocky rhombohedral calcite. Also, times greater than about one hundred twenty (120) minutes may increase the production cost.

The CaO or Ca(OH)$_2$ may be added in a dry form such as a powder or granular material to the reaction mixture. Preferably, the CaO is reacted with water to form an aqueous suspension or slurry of Ca(OH)$_2$, and then added to the reaction mixture.

In still another aspect of the process according to the present invention, the aqueous suspension or slurry of Ca(OH)$_2$ may be added at a rate to control the solution conductivity to within the specified preferred range for the entire reaction. Preferably, the solution conductivity may be initially controlled to within the specified range of from about 25 percent to about 50 percent of the total reaction, after which the aqueous suspension or slurry of Ca(OH)$_2$ may be added quickly and reacted with CO$_2$ to form the acicular calcite/aragonite composition of the present invention. When the solution conductivity is controlled for less than about 25 percent of the total reaction it is difficult to control the conductivity to within the specified range.

The temperature of the reaction of the present invention may be carried out over a broad range, of from about 25° Centigrade (C) to about 60° C., with a preferred temperature of from about 35° C. to about 50° C. When the reaction temperature is less than about 25° C., the acicular calcite and acicular aragonite product of the present invention may not be produced. Reaction temperatures above 60° C., significantly increase the cost of production. Reaction times can range from about 60 minutes to about 360 minutes, with a preferred range of from about 90 minutes to about 180 minutes. When the reaction time is less than about 60 minutes, the final product is not acicular calcite/aragonite of the present invention, under most conditions. When the reaction time is greater than about 360 minutes, the cost of production increases significantly.

Water soluble aluminum compounds used in the present invention may come from any sources. Sources of water soluble aluminum compounds that have proven to be effective in the present invention may be selected from the group consisting of anhydrous aluminum chloride, aluminum chloride hydrate, polyaluminum chloride, aluminum nitrate, sodium aluminum sulfate, potassium aluminum sulfate, ammonium aluminum sulfate, anhydrous aluminum sulfate, aluminum sulfate hydrate, and the like. Aluminum sulfate hydrate, also referred to as papermaker's alum, available either as a dry granular material or as an aqueous solution, is the preferred water soluble aluminum compound. The amount of water soluble aluminum compound used in the present invention ranges from about 0.5 percent to about 5.0 percent of water soluble aluminum compound, based on the dry weight of acicular calcite/aragonite produced. When the water soluble aluminum compound is less than about 0.5 percent, the final product is not acicular calcite/aragonite, under most conditions. When the amount of water soluble aluminum compound is greater than about 5.0 percent, the morphology structure is not the product of the final invention, under most conditions. Preferably, the amount of water soluble aluminum compound used in the present invention ranges from about 1.5 percent to about 3.0 percent of water soluble aluminum compound, based on the dry weight of acicular calcite/aragonite produced. The water soluble aluminum compound, in a dry granular or powder form, can be blended with CaO or $Ca(OH)_2$, also in a dry granular or powder form, and the resulting blend is then added to the reaction mixture. The preferred method is to add the water soluble aluminum compound to a reaction vessel containing water, then add $Ca(OH)_2$ or CaO and $CO_2$ to the reaction vessel. The amount of water used in the reaction vessel is sufficient to allow adequate agitation when the $Ca(OH)_2$ is added.

The following examples are offered to further illustrate the broad aspect of the composition, the method and the use of the acicular calcite/acicular aragonite crystal of the present invention. The examples are in no way intended to limit the scope, breath or range of the present invention in any material aspect whatsoever. Only the broadest reading and most liberal interpretation of appended claims, as attached hereto, should be used to define the modes, bounds and limits of the present invention.

EXAMPLE 1

Into a 4-liter stainless reactor equipped a stirrer and a $CO_2$ injection tube there was introduced 1000 milliliters (ml) of water heated to 45° C. To the water was added 15.2 grams (g) of aluminum sulfate hydrate (alum) with sufficient stirring to dissolve the alum. This quantity corresponded to 3.0 percent alum, based on the dry weight of calcium carbonate produced. After the alum was dissolved, a gas flow of 15 percent $CO_2$/85 percent air was introduced to the alum solution in the reactor at a gas flow rate of 7.65 liters/min. A flow of $Ca(OH)_2$ slurry having a concentration of 159 g $Ca(OH)_2$ per liter of slurry was then started. The flow rate of the $Ca(OH)_2$ slurry into the reactor was adjusted to maintain a solution conductivity within the reactor of about 5.0 mS/cm. A total of 2000 ml of $Ca(OH)_2$ slurry was added over a total of 68 minutes. Addition of the $CO_2$/air mixture was then continued until the pH of the reaction mixture became 7.5, indicating that the reaction was substantially complete. The total reaction time was 114 minutes.

The resulting calcium carbonate product consisted of clusters of acicular crystals having an average equivalent spherical diameter of 3.3 microns and a specific surface area of 6.0 $m^2/g$. X-ray diffraction (XRD) analysis showed the product to be composed of 65 percent aragonite and 35 percent calcite. FIG. 1 is a microphotograph of the resulting spherical clusters of calcium carbonate product.

EXAMPLE 2

Into a 2300-liter reactor equipped a stirrer and a $CO_2$ injection tube there was introduced 760 liters of water heated to 50° C. To this water was added 9.8 kg of aluminum sulfate hydrate (alum) with sufficient stirring to dissolve the alum. This quantity corresponded to 3.0 percent alum, based on the dry weight of calcium carbonate produced. After the alum was dissolved, a gas flow of 15 percent $CO_2$/85 percent air was introduced to the alum solution in the reactor at a gas flow rate of 4330 liters/min. A flow of $Ca(OH)_2$ of slurry having a concentration of 144g Ca $(OH)_2$ per liter of slurry was then started. The flow rate of the $Ca(OH)_2$ slurry into the reactor was adjusted maintain a solution conductivity within the reactor of about 5.0 mS/cm. After the first 30 minutes of the reaction during which 340 liters of $Ca(OH)_2$ slurry were added to the reactor at a rate to control the conductivity at approximately 5.0 mS/cm, the remaining 990 liters of $Ca(OH)_2$ slurry were added quickly to the reactor, within about 8 minutes. Addition of the $CO_2$/air mixture was then continued until the pH of the reaction mixture became 7.5, indicating that the reaction was substantially complete. The total reaction time was 117 minutes.

The resulting calcium carbonate product consisted of clusters of acicular crystals having an average equivalent spherical diameter of 3.5 microns and a specific surface area of 6.1 $m^2/g$. X-ray diffraction (XRD) analysis showed the product to be composed of 40 percent aragonite and 60 percent calcite. FIG. 2 is a microphotograph of the resulting spherical clusters of calcium carbonate product.

EXAMPLE 3

Into a 4-liter stainless steel reactor equipped a stirrer and a $CO_2$ injection tube there was introduced 3000 ml of water heated to 35° C. To this water was added 17.3 g of aluminum sulfate hydrate (alum) with sufficient stirring to dissolve the alum. This quantity corresponded to 3.0 percent alum, based on the dry weight of calcium carbonate produced. After the alum was dissolved, a gas flow of 30 percent $CO_2$/70 percent air was introduced to the alum solution in the reactor at a gas flow rate of 8.70 liters/min. A flow of granular CaO (quicklime) was then started. The flow rate of the granular CaO into the reactor was adjusted to maintain a solution conductivity within the reactor of about 5.0 mS/cm. A total of 350 g of granular CaO were added over a total of 60 minutes. Addition of the $CO_2$/air mixture was then continued until the pH of the reaction mixture became 7.5, indicating that the reaction was substantially complete. The total reaction time was 110 minutes.

The resulting calcium carbonate product consisted of clusters of acicular crystals having an average equivalent spherical diameter of 3.4 microns and a specific surface area of 6.9 $m^2/g$. X-ray diffraction (XRD) analysis showed the product to be composed of 75 percent aragonite and 25 percent calcite.

FIG. 3 is a microphotograph of the resulting spherical clusters of calcium carbonate product.

EXAMPLE 4

Into a 4-liter stainless steel reactor equipped a stirrer and a $CO_2$ injection tube there was introduced 1000 ml of water heated to 45° C. To this water was added 12.4 g of aluminum chloride hydrate with sufficient stirring to dissolve the aluminum compound. This quantity corresponded to 3.0 percent aluminum chloride hydrate, based on the dry weight of calcium carbonate produced. After the aluminum chloride hydrate was dissolved, a gas flow of 15 percent $CO_2$/85 percent air was introduced to the aluminum chloride solution in the reactor at a gas flow rate of 6.91 liters/min. A flow of $Ca(OH)_2$ slurry having a concentration of 153 g $Ca(OH)_2$ per liter of slurry was then started. The flow rate of the $Ca(OH)_2$ slurry into the reactor was adjusted such that a total of 2000 ml of $Ca(OH)_2$ slurry was added over a total of 60 minutes. Addition of the $CO_2$/air mixture was then continued until the pH of the reaction mixture became 8.0, indicating that the reaction was substantially complete. The total reaction time was 110 minutes.

The resulting calcium carbonate product consisted of clusters of acicular crystals having an average equivalent spherical diameter of 3.0 microns and a specific surface area of 7.8 m²/g. X-ray diffraction (XRD) analysis showed the product to be composed of 60 percent aragonite and 40 percent calcite.

FIG. 4 is a microphotograph of the resulting spherical clusters of calcium carbonate product.

EXAMPLE 5

Handsheets having a basis weight of 60 g/m² (40 lbs/3300 ft²) were prepared using a Noble and Wood sheet former, well known to those skilled in the art. The pulp furnish consisted of 75 percent bleached hardwood and 35 percent bleached softwood Kraft pulps beaten to 400 Canadian Standard Freeness (CSF) at pH 7.0 in distilled water. A high molecular weight, medium charge density cationic polyacrylamide (PAM) retention aid was used at a level of 0.05 percent (1 lb PAM per ton of paper). An all ketene dimer (AKD) synthetic sizing agent was used at a level of 0.25 percent (5 lbs. AKD per ton of paper). The fillers were added to the pulp furnish to achieve a target filler loading level of 20 percent. The sheets were conditioned at 50 percent relative humidity and 23° C. prior to testing.

The fillers evaluated in this handsheet study included an acicular calcite/aragonite precipitated calcium carbonate (PCC) of the present invention having an average equivalent spherical diameter of 3.5 microns and a specific surface area of 6.1 m²/g. For comparison, a scalenohedral morphology PCC having an average equivalent spherical diameter of 1.5 microns and a specific surface area of 10.3 m²/g was also evaluated.

TABLE 1

Handsheet Study Results Comparing the Performance of Acicular Calcite/Aragonite PCC and Scalenohedral Calcite PCC

| PCC Filler Description | Percent Filler | Sheet Bulk[1] cc/g | Breaking Length[2], meters | Gurley Stiffness[3], mg | Hercules Size Test[4] seconds |
|---|---|---|---|---|---|
| Acicular Calcite/ Aragonite PCC | 20.3 | 2.15 | 2300 | 61.9 | 230 |
| Scaleno- hedral PCC | 20.0 | 2.04 | 1900 | 51.9 | 32 |

[1]Technical Association of the Pulp and Paper Industry (TAPPI) Test Method T220 om-88
[2]TAPPI Test Method T494 om-88
[3]TAPPI Test Method T543 om-94
[4]TAPPI Test Method T530 pm-89

Table 1 summarizes the results of the handsheet study. The results show that the acicular calcite/aragonite PCC of the present invention provides a balance of sheet bulk, strength, stiffness, and sizing.

EXAMPLE 6

A sample of acicular calcite/aragonite PCC was dispersed and media milled at 70 percent solids to achieve an average equivalent spherical diameter of 0.53 microns and a specific surface area of 11.8 m²/g. The dispersed, media milled acicular calcite/aragonite PCC was evaluated in the paper coating study in this example. For comparison, a prismatic morphology calcite PCC having an average equivalent spherical diameter of 0.59 microns and a specific surface area of 8.8 m²/g and a media milled aragonite PCC having an average equivalent spherical diameter of 0.46 microns and a specific surface area of 11.5 m²/g were also evaluated.

The coating formulation used in this study consisted of a blend of 50 parts PCC and 50 parts high brightness No. 1 clay, well known to those skilled in the art. A latex/starch binder system was used in the coating formulation. Coatings having a target coat weight of 9 lbs. per 3300 ft² were prepared using a cylindrical laboratory coater (CLC-6000) operating 2500 ft/min. The coated sheets were calendered using a 2 nip press at 331 pounds per linear inch prior to testing.

TABLE 2

| PCC Coating Pigment | Sheet Gloss[1], percent |
|---|---|
| Media Milled Calcite/Aragonite PCC | 70.0 |
| Prismatic PCC | 70.7 |
| Media Milled Aragonite PCC | 70.4 |

[1]TAPPI Test Method T480 om-92

Table 2 summarizes the results of the coating study. The results show that the media milled acicular calcite/aragonite PCC of the present invention provides gloss characteristics suitable for high gloss coated paper. The purpose of Table 2 is to demonstrate that upon media milling alone provides suitable gloss characteristics.

We claim:

1. A composition comprising a water soluble aluminum compound and spherical clusters of acicular calcite and acicular aragonite calcium carbonate, wherein the ratio of acicular calcite and acicular aragonite is from about 25 percent calcite and 75 percent aragonite to about 75 percent calcite and 25 percent aragonite and the spherical clusters consist of rod-shaped or needle-shaped acicular crystals, said spherical clusters being of average equivalent spherical diameter of from about 2.0 microns to about 8.0 microns and a specific surface area of from about 5.0 m²/g to about 10 m²/g and wherein said rod-shaped or needle-shaped crystals being of a length of from about 1.0 microns to about 4.0 microns and a width of from about 0.1 microns to about 0.5 microns.

2. The composition according to claim 1 wherein the water soluble aluminum compound is selected from the group consisting of anhydrous aluminum chloride, aluminum chloride hydrate, polyaluminum chloride, aluminum nitrate, sodium aluminum sulfate, potassium aluminum sulfate, ammonium aluminum sulfate, anhydrous aluminum sulfate, and aluminum sulfate hydrate.

3. The composition according to claim 2 wherein the water soluble aluminum compound is aluminum sulfate hydrate.

4. The composition according to claim 3 wherein the amount of water soluble aluminum compound ranges from about 1.5 percent to about 3.0 percent, based on the dry weight of clustered acicular calcite and acicular aragonite crystals.

* * * * *